US011663739B2

United States Patent
Dos Santos Mendonca et al.

(10) Patent No.: US 11,663,739 B2
(45) Date of Patent: May 30, 2023

(54) FIDUCIAL MARKER BASED FIELD CALIBRATION OF A DEVICE

(71) Applicant: Microsoft Technology Licensing, LLC, Redmond, WA (US)

(72) Inventors: Paulo Ricardo Dos Santos Mendonca, Seattle, WA (US); Christopher Charles Aholt, Newcastle, WA (US); Christopher Maurice Mei, Redmond, WA (US); Rayna Demaster-Smith, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 17/199,241

(22) Filed: Mar. 11, 2021

(65) Prior Publication Data

US 2022/0292718 A1 Sep. 15, 2022

(51) Int. Cl.
*G06T 7/80* (2017.01)
*G06T 7/73* (2017.01)
*B60R 1/00* (2022.01)
*G06F 3/01* (2006.01)

(52) U.S. Cl.
CPC .............. *G06T 7/80* (2017.01); *B60R 1/00* (2013.01); *G06F 3/013* (2013.01); *G06T 7/74* (2017.01); *B60R 2300/103* (2013.01); *G06T 2207/10048* (2013.01); *G06T 2207/30208* (2013.01)

(58) Field of Classification Search
CPC ... G06T 7/80; G06T 7/74; G06T 2207/10048; G06T 2207/30208; B60R 1/00; B60R 2300/103; G06F 3/013
See application file for complete search history.

(56) References Cited

U.S. PATENT DOCUMENTS

| 11,137,610 | B1* | 10/2021 | Kessler | H04N 9/3138 |
| 2017/0031435 | A1 | 2/2017 | Raffle et al. | |
| 2018/0004289 | A1* | 1/2018 | Wilson | G06V 10/143 |
| 2019/0273114 | A1* | 9/2019 | Liu | G02B 27/0172 |
| 2020/0209628 | A1* | 7/2020 | Sztuk | G02B 27/0176 |
| 2021/0228075 | A1* | 7/2021 | Zhang | A61B 3/111 |
| 2022/0014689 | A1* | 1/2022 | Zahnert | H04N 5/33 |

(Continued)

OTHER PUBLICATIONS

"International Search Report & Written Opinion issued in PCT Application No. PCT/US22/017401", dated May 9, 2022, 13 Pages.

(Continued)

*Primary Examiner* — Michael Lee
(74) *Attorney, Agent, or Firm* — Alleman Hall Creasman & Tuttle LLP (57) ABSTRACT

A computer-implemented method of field calibrating a device is disclosed. In one example, a reference image is acquired, via an infrared camera, while the device is in a factory-calibrated state. The reference image measures a factory-calibrated spatial relationship of one or more infrared-visible fiducial markers of the device relative to the infrared camera while the device is in the factory-calibrated state. Later, a field image is acquired, via the infrared camera. The field image measures an updated spatial relationship of the one or more infrared-visible fiducial markers relative to the infrared camera. The device is field calibrated based on the reference image and the field image.

20 Claims, 7 Drawing Sheets

(56) References Cited

U.S. PATENT DOCUMENTS

2022/0146832 A1* 5/2022 Choi .................. G02B 27/0172

OTHER PUBLICATIONS

"What are the black and white circular patterns on the Curiosity rover?", Retrieved From: https://web.archive.org/web/20210227074315/https://space.stackexchange.com/questions/2985/what-are-the-black-and-white-circular-patterns-on-the-curiosity-rover, 2 Pages, Dec. 2, 2013.

"What are these stickers for?", Retrieved From: https://web.archive.org/web/20210224115829/https://www.reddit.com/r/PerseveranceRover/comments/lrb408/what_are_these_stickers_for/, Feb. 24, 2021, 1 Page.

* cited by examiner

FIG. 9

FIDUCIAL MARKER BASED FIELD CALIBRATION OF A DEVICE

BACKGROUND

Sensors perform measurements and collect environmental data that may be used as input to control operation of a device. Sensor measurements may be compared to reference measurements or reference data to determine proper functionality of the sensor/device. Such a procedure may be referred to as sensor/device calibration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer-implemented method of field calibrating a device is disclosed. In one example, a reference image is acquired, via an infrared camera, while the device is in a factory-calibrated state. The reference measurement measures a factory-calibrated spatial relationship of one or more infrared-visible fiducial markers of the device relative to the infrared camera while the device is in the factory-calibrated state. Later, a field image is acquired, via the infrared camera. The field image measures an updated spatial relationship of the one or more infrared-visible fiducial markers relative to the infrared camera. The device is field calibrated based on the reference image and the field image.

DETAILED DESCRIPTION

Generally, the most accurate level of sensor/device calibration is achieved through an elaborate calibration process referred to as factory calibration. Factory calibration of a sensor/device is typically performed in a highly controlled environment, such as in a manufacturing plant that produces the sensor or the device. In one example, a sensor in the form of a camera that is mounted on a device is factory calibrated. In this example, the factory calibration process includes very carefully mounting the camera with a known spatial relationship relative to the device. The highly controlled environmental conditions allow for extrinsic and intrinsic properties of the camera to be determined while the camera remains in this, perhaps temporary, tightly controlled spatial relationship.

However, once a device leaves the highly controlled factory environment, the device may be subject to external effects, such as physical forces, changes in temperature, vibration, deliberate adjustments, and other external effects. Such external effects can alter the factory-calibrated sensor in hard-to-predict ways that can reduce the accuracy of sensor measurements and can negatively affect operation of the device.

Accordingly, the presented description is directed to an approach for field calibration of a device using sensor-conspicuous fiducial markers that are integrated into the device. As used herein, the term "integrated" refers to the fiducial markers having a fixed and precisely known position on the device while the device is in a factory calibrated state. The sensor-conspicuous fiducial markers are observable by a sensor of the device during regular device operation out in the "field" away from the highly controlled environment in which factory calibration is performed. In one example, a reference measurement is acquired, via a sensor of a device, while the device is in a factory-calibrated state. The reference measurement measures a factory-calibrated spatial relationship of one or more sensor-conspicuous fiducial markers of the device relative to the sensor while the device is in the factory-calibrated state. Later, field measurements may be acquired, via the sensor, in order to determine if the device has remained in its factory calibrated state. The field measurement measures an updated spatial relationship of the one or more sensor-conspicuous fiducial markers relative to the sensor. If the device has shifted out of its factory calibrated state, the device may be field calibrated based on the reference measurement and the field measurement.

By integrating the fiducial markers into the device in a manner in which the fiducial markers are observable by the sensor, the device can be field calibrated during operation with a greater level of accuracy than other calibration approaches that rely on field measurements of environmental data that does not have an established factory-calibrated spatial relationship, such as features of a real-world physical scene. Moreover, the fiducial markers may be designed to be conspicuous and detectable by the sensor such that both the robustness and accuracy of the field-calibration process is improved relative to other calibration approaches that rely on field measurements of environmental data that does not have an established factory-calibrated spatial relationship.

Figure 1:
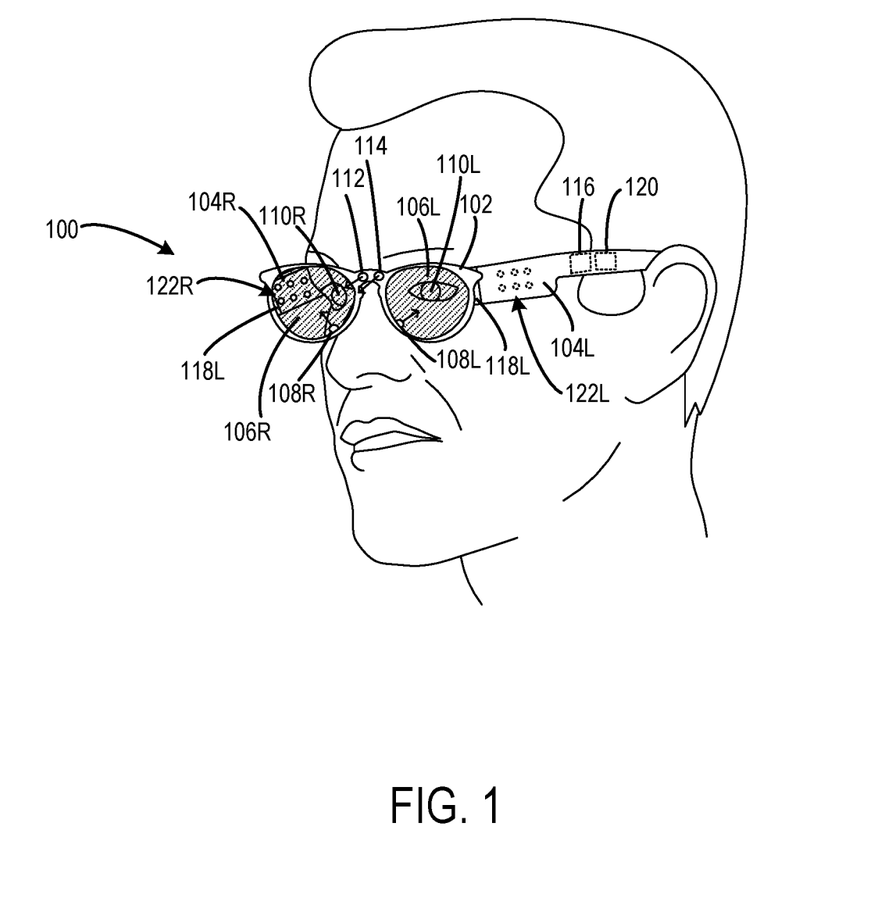
FIGS. 1-2 show an example eye-tracking device including integral sensor-conspicuous fiducial markers for field calibration of the eye-tracking device.

FIG. 1 shows an example eye-tracking device 100 that includes integrated sensor-conspicuous fiducial markers that may be used for field calibration of the eye-tracking device 100. The eye-tracking device 100 comprises a display frame 102 and left and right temple extensions 104L, 104R that are coupled on respective left and right sides of the display frame 102. The display frame 102 is configured to position left and right near-eye displays 106L, 106R in respective fields of view of the user's eyes.

In some implementations, the eye-tracking device 100 may take the form of a virtual reality device that includes opaque, non-see-through near-eye displays. In other implementations, the eye-tracking device 100 may take the form of an augmented/mixed reality device that comprises at least partially transparent near-eye displays that are configured to enable a user of the augmented reality device to view physical, real-world objects in a physical space through one or more partially transparent pixels displaying virtual object representations. It will be appreciated that the following descriptions of sensors and devices is not limited to virtual reality devices and/or augmented reality devices, but instead is broadly applicable to any device with spatially calibrated sensors. While example eye-tracking device 100 and autonomous vehicle 500 are used as two example devices, these devices are not limiting in any way. The disclosed fiducial marker-based field calibration may be applied to any other suitable device including spatially calibrated sensors.

Various suitable display technologies and configurations may be used to display images via the left and right near-eye displays 106L, 106R. In the example of an augmented reality device, the left and right near-eye displays 106L, 106R may comprise image-producing elements such as, for example, a liquid crystal on silicon (LCOS) micro display or scanned beam projector, and a see-through waveguide-based or prism-based combiner to deliver virtual images to the user for viewing in combination with the real-world background. Virtual reality displays may utilize similar image-producing elements, but may comprise an opaque enclosure, rather than a transparent combiner.

In the illustrated implementation, the left and right near-eye displays 106L, 106R collectively form a stereoscopic display configuration. The left and right near-eye displays 106L, 106R each visually present a view of an augmented reality scene from the perspective of the user's corresponding eye. By viewing the augmented reality scene through the left and right near-eye displays 106L, 106R, the user will perceive virtual objects as being located at particular depths in the real world. In other implementations, the eye-tracking device 100 may include a single display viewed by both of the user's eyes.

Additionally, the display frame 102 supports different sensors of the eye-tracking device 100. Left and right infrared eye-tracking cameras 108L, 108R are disposed on the display frame 102 and positioned to image the user's left and right eyes 110L, 110R. Digital image data from the infrared eye-tracking cameras 108L, 108R may be conveyed to a computer 116 disposed in the left temple extension 104L or other suitable local or remote location. The computer 116 may include a logic processor, volatile memory, and non-volatile storage, as discussed in more detail below with respect to the example computing system 900 shown in FIG. 9.

Figure 2:
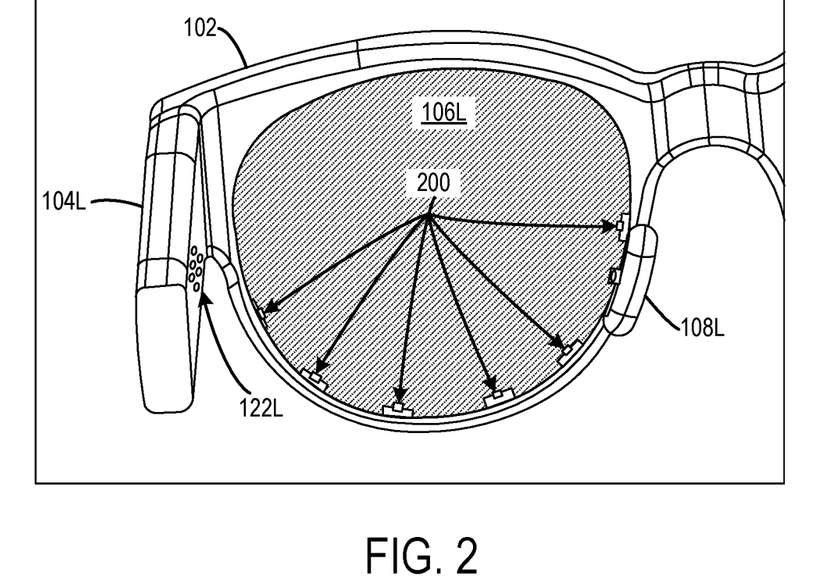

FIG. 2 shows a close-up view of the left side of the eye-tracking device 100. Note that the arrangement shown in FIG. 3 may be mirrored on a right side of the eye-tracking device 100. A plurality of infrared illuminators 200 is disposed on the display frame 102. Each infrared illuminator is configured to emit infrared (IR) or near-infrared (NIR) illumination in a high-sensitivity wavelength band of the infrared eye-tracking cameras 108L, 108R. Each infrared illuminator may comprise a light-emitting diode (LED), diode laser, discharge illumination source, or another type of infrared illuminator. The plurality of infrared illuminators 200 are positioned on the display frame 102 to illuminate the user's left eye 110L.

Figure 3:
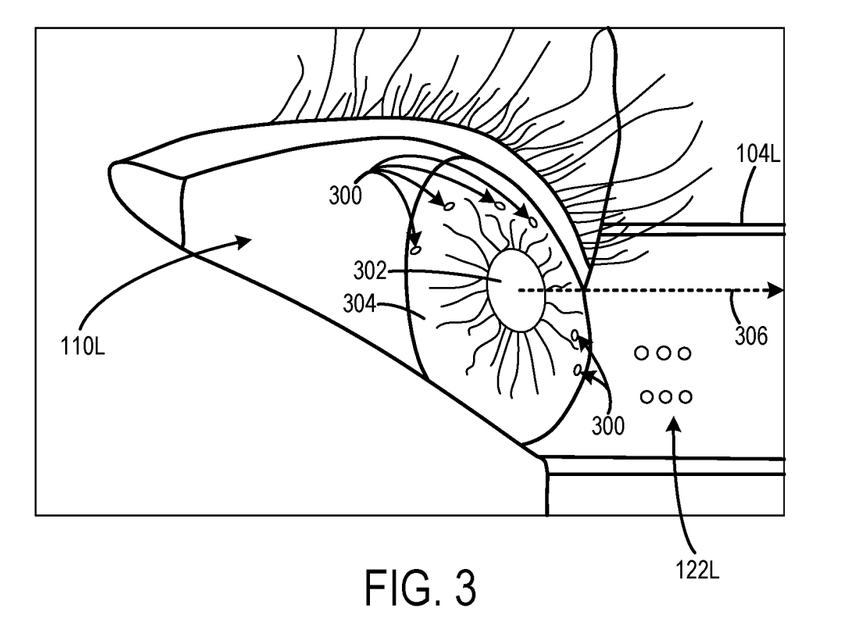
FIG. 3 shows an example view from an infrared eye-tracking camera of the eye-tracking device shown in FIGS. 1-2.

FIG. 3 shows an example view from a perspective of the left eye-tracking camera 108L. The left eye-tracking camera 108L is disposed on the display frame 102 such that both the user's left eye 110L and the set of infrared-visible fiducial markers 122L are visible in the field of view of the eye-tracking camera 108L when the eye-tracking device 100 is worn by the user. Specular glints 300 are created by infrared illumination emitted by the plurality of infrared illuminators 200 (shown in FIG. 2) and reflected off of the cornea of the user's left eye 110L to perform eye-tracking. In some examples, the plurality of infrared illuminators 200 (shown in FIG. 2) may be used to illuminate the left eye 110L for a 'dark pupil' effect, where a pupil 302 appears darker than the surrounding iris 304.

Returning to FIG. 1, the display frame 102 further supports an outward-facing visible light camera 112 and an outward-facing depth camera 114. The outward-facing visible light camera 112 is configured to capture color or monochrome imagery of a real-world physical scene and convey such color/monochrome imagery to the computer 116. The outward-facing depth camera 114 is configured to capture depth imagery of the real-world physical scene and convey such depth imagery to the computer 116. For example, the outward-facing depth camera 114 may include a time-of-flight depth camera, a structured-light depth camera, or a LIDAR camera. Additionally, the outward-facing cameras 112, 114 may be configured to capture and/or measure physical attributes of the real-world physical space in which the eye-tracking device 100 resides.

The left and right temple extensions 104L, 104R extend away from the display frame 102 and are configured to rest on the user's ears to retain the eye-tracking device 100 on the user's head. The left temple extension 104L is coupled to a left side of the display frame 102 via a left hinge 118L. The right temple extension 104R is coupled to a right side of the display frame 102 via a right hinge 118R. The left and right hinges 118L, 118R allow for the left and right temple extensions 104L, 104R to fold inward toward the display frame 102 such that the eye-tracking device 100 may have a compact form factor. In the illustrated configuration, the left hinge 118L is intermediate the eye-tracking camera 108L disposed on the display frame 102 and the set of sensor-conspicuous fiducial markers 122L disposed on the left temple extension 104L. Any suitable hinge or joint may be intermediate the eye-tracking camera and the set of sensor-conspicuous fiducial markers. The right side of the eye-tracking device 100 may have a similar configuration.

An inertial measurement unit (IMU) 120 is disposed in the left temple extension 104L or other suitable location. The IMU 120 may include one or more accelerometers, gyroscopes, and/or magnetometers. The IMU 120 is configured to measure linear and/or angular acceleration of the eye-tracking device 100. The IMU 120 may convey such measurements to the computer 116 to establish a six-degree-of-freedom (6DOF) position and orientation of the eye-tracking device 100.

Sets of sensor-conspicuous fiducial markers 122L, 122R are disposed on the left and right temple extensions 104L, 104R. In particular, the sets of sensor-conspicuous fiducial markers 122L, 122R are positioned on the inner left and right temple extensions 104L, 104R such that the sets of sensor-conspicuous fiducial markers 122L, 122R are visible in respective fields of view of the left and right infrared eye-tracking cameras 108L, 108R. For example, the sensor-conspicuous fiducial markers 122L, 122R may be printed on respective inward-facing surfaces of the temple extensions 104L, 104R.

In this case, since the sensors take the form of infrared eye-tracking cameras that detect light in the IR or near-IR spectrum, the sensor-conspicuous fiducial markers 122L, 122R are specifically designed to be infrared-visible. In the illustrated implementation, the infrared-visible fiducial markers are infrared reflective markers (e.g., paint, stickers) that are configured to passively reflect infrared light emitted from the plurality of infrared illuminators 200 (shown in FIG. 2) to the infrared eye tracking cameras 108L, 108R. In some implementations, the infrared reflective markers may be color-light invisible, such that the fiducial markers are not perceivable by the naked eye. In other implementations, the infrared-visible fiducial markers may include active infrared illuminators (e.g., infrared LEDs). In some implementations, the infrared-visible fiducial markers may be contained inside the temple extensions 104L, 104R and occluded from a human observer. Physical properties of the temple extensions 104L, 104R may allow for the unobstructed passage of IR light from the infrared-visible fiducial markers through the temple extensions 104L, 104R to the eye-tracking cameras 108L, 108R. By employing fiducial markers that are infrared visible, the infrared camera may easily distinguish the fiducial markers from the surrounding environment. Further, the infrared-visible fiducial markers may be inconspicuous to the user's eyes (and in examples where the fiducial markers are color-light invisible, not perceivable by the user at all). This allows for the infrared-visible fiducial markers to not distract a user from viewing the display, especially when the infrared-visible fiducial markers are positioned in a user's peripheral field of view. Similarly, in examples where the fiducial makers include active infrared illuminators, the eye-tracking infrared camera may easily recognize the active infrared illumination without such active infrared illumination distracting the user since the infrared illumination is not in the visible spectrum perceivable by the user's eye.

In yet other implementations, knowledge of the shape and appearance of the area observed by the eye-tracking cameras 108L, 108R may be sufficient to serve the purpose of a fiducial marker. For example, a planar surface, a right angle, or another geometric feature may be used as a fiducial marker that is observed by the eye-tracking cameras 108L, 108R.

In the illustrated example, each set of infrared-visible fiducial markers includes six infrared-visible fiducial markers arranged in two rows of three fiducial markers. In other examples, the sets of infrared-visible fiducial markers may include a different number of infrared-visible fiducial markers. Moreover, the sets of infrared-visible fiducial markers may be arranged in any suitable pattern on the temple extensions.

As shown in FIG. 2, each sensor-conspicuous fiducial marker in the set 122L has a factory-calibrated spatial relationship relative to each other sensor-conspicuous fiducial marker in the set 122L and to the infrared eye-tracking camera 108L while the eye-tracking device 100 is in a factory-calibrated state. In particular, an exact distance between each sensor-conspicuous fiducial marker in the set 122L and the left eye-tracking camera 108L may be determined during design and/or factory calibration of the eye-tracking device 100 while the eye-tracking device 100 is in a factory calibrated state. Such measurements may be referred to as reference measurements or reference data that may be used for field calibration of the eye-tracking device 100 as discussed in more detail below.

The use of sensor-conspicuous fiducial markers has the benefit that the sensor-conspicuous fiducial markers are virtually weightless and not bound by space constraints, particularly if the sensor-conspicuous fiducial markers are merely painted onto an already existing structure of the eye-tracking device 100. Although relevant to any scenario, this consideration is particularly important to head-mounted devices where weight and volume are at a premium.

The computer 116 is configured to enact various processes to control operation of the eye-tracking device 100 based on input from sensors of the eye-tracking device 100. As one example, the computer 116 may be configured to assess a position of the eye-tracking device 100 relative to the real-world physical environment based on signals received from the IMU 120, color/monochrome images received the outward-facing visible light camera 112, and/or depth images received from the outward-facing depth camera 114.

As another example, the computer 116 may be configured to receive infrared images from the infrared eye-tracking cameras 108L, 108R and perform eye-tracking operations based on such images. In one example, such image data may be processed to resolve various eye features including a center of the pupil 302, an outline of the pupil 302, an outline of the iris 304 and/or positions of specular glints 300 reflected by the cornea. Further, the resolved locations of such eye features may be used as input parameters in a mathematical model (e.g., a polynomial model) that relates feature position to a gaze axis 306 (shown in FIG. 3) that indicates where the eye is looking. In some implementations, the computer 116 may be configured to determine a separate gaze axis for the right and left eyes 110L, 110R and further calculate a user's focal point at the intersection of the right and left gaze axes. Such eye-tracking operations are provided as non-limiting examples. The computer 116 may be configured to perform any suitable eye-tracking operations based on imagery received from the eye-tracking cameras 108L, 108R.

As yet another example, the computer 116 may be configured to generate images for visual presentation on the left and right near-eye displays 106L, 106R. The computer 116 may use sensor data received from the outward facing cameras 112, 114, the eye-tracking cameras 108L, 108R, the IMU 120, and/or any other sensors of the eye-tracking device 100 to properly position virtual content on the left and right near-eye displays 106R, 106L.

Throughout operation, the eye-tracking device 100 may experience various external effects that may shift the eye-tracking device 100 away from a factory calibrated state. The computer 116 may be configured to perform field calibration of the eye-tracking device 100 using the sensor-conspicuous fiducial markers 122L, 122R while the eye-tracking device 100 is in regular use, rather than in a highly controlled factory environment. For this discussion of field calibration of the eye-tracking device 100, the sensor being used is the left eye-tracking camera 108L that observes the left set of infrared-visible fiducial markers 122L disposed on the left temple extension 104L. The same field calibration concepts may be broadly applicable to other sensors of the eye-tracking device 100, such as the right eye-tracking camera 108R that observes the right set of infrared-visible fiducial markers 122R disposed on the right temple extension 104R.

The computer 116 may be configured to acquire, via the left eye-tracking camera 108L, a reference image while the eye-tracking device 100 is in a factory-calibrated state. The reference image measures the factory-calibrated spatial relationship of the infrared-visible fiducial markers 122L relative to the eye-tracking camera 108L while the device is in the factory-calibrated state. For example, the reference image may be captured and stored in memory of the computer 116 during manufacture of the eye-tracking device 100 under highly controlled conditions.

In some examples, the eye-tracking device 100 may be placed in the factory-calibrated state by controlling (or at least knowing) environmental conditions, such as temperature, humidity, and other environmental conditions. In some examples, the eye-tracking device 100 may be placed in the factory-calibrated state by controlling (or at least knowing) a position of the device. In some examples, the position of the eye-tracking device 100 may be specified in three degrees of freedom (e.g., X, Y, Z). In other examples, the position of the eye-tracking device 100 may be specified in six degrees of freedom (e.g., X, Y, Z, pitch, roll, yaw). In one example, the eye-tracking device 100 may be placed in a factory calibration mechanism that accurately and/or repeatably holds the eye-tracking device 100 in a specified position by use of active alignment or repeatable kinematic mounting to place the eye-tracking device 100 in the factory-calibrated state while the reference image is being acquired.

In some examples, the device may be placed in the factory-calibrated state by specifying (or at least knowing) operational settings of the eye-tracking device 100. In the case of the eye-tracking camera 108L, such operational settings may include one or more extrinsic parameters and one or more intrinsic parameters of the eye-tracking camera 108L while the eye-tracking device 100 is in the factory-calibrated state. The extrinsic parameters may include an orientation of the eye-tracking camera 108L including a rotation, R, and a translation, t. Further, an origin of the eye-tracking camera's coordinate system may be defined relative to an optical center and an image plane that is defined along determined x- and y-axes in relation to the optical center. The intrinsic parameters of the eye-tracking camera may include a focal length, an optical center, and a skew coefficient. In some examples, other extrinsic and intrinsic parameter may be determined for the eye-tracking camera 108L while the eye-tracking device is in the factory-calibrated state.

Furthermore, once the eye-tracking device 100 is out in the field and exposed to external effects that may change the state of the eye-tracking device 100, the computer 116 may be configured to acquire, via the eye-tracking camera 108L, a field image measuring an updated spatial relationship of the sensor-conspicuous fiducial markers 122L relative to the eye-tracking camera 108L. The field image may be acquired by the eye-tracking camera 108L responsive to any suitable field trigger. In some implementations, the computer 116 may be configured to monitor calibration parameters of the eye-tracking camera 108L, such as extrinsic and intrinsic parameters of the camera, throughout operation of the eye-tracking device. The computer 116 may be configured to acquire the field image responsive to detecting a deviation of a calibration parameter greater than a deviation threshold. In other implementations, the computer 116 may be configured to acquire field images for field calibration according to a designated sampling frequency (e.g., every hour, day, month, year of operation of the eye-tracking device).

The computer 116 may be configured to field calibrate the eye-tracking device 100 based on a comparison of the reference image and the field image. In one example, a change in calibration parameters (e.g., extrinsic and intrinsic parameters of the eye-tracking camera) compared to nominal values established by design, or measured after manufacturing or assembly, may be estimated by the computer 116 based on a change in the appearance of the infrared-visible fiducial makers 122L between the reference image and the field image.

Figure 4:
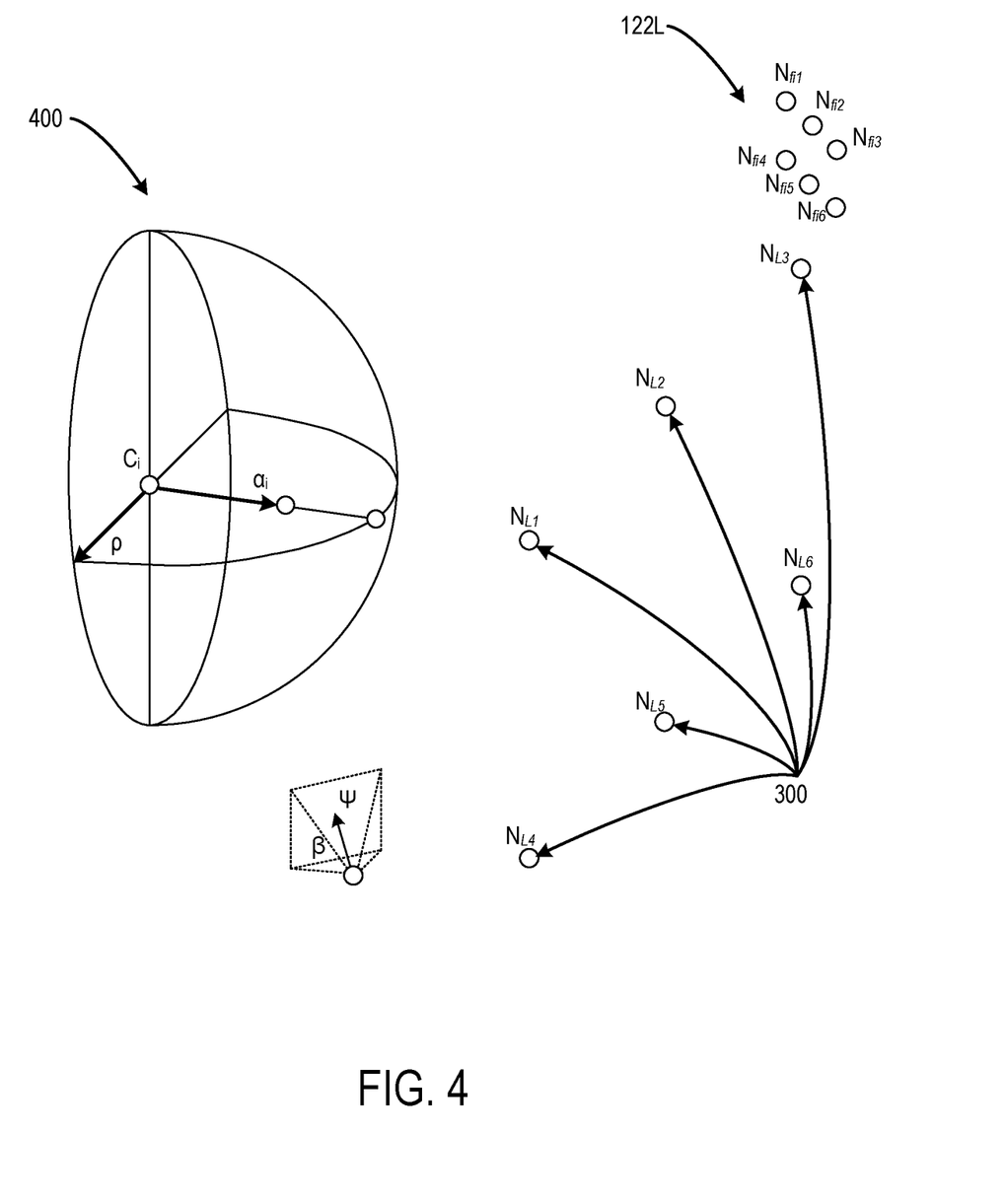
FIG. 4 shows a visualization of a mathematical model of a spatial relationship between a user's eye, glints, fiducial markers, and an infrared eye-tracking camera of the eye-tracking device shown in FIGS. 1-2.

In one example, the change in appearance of the infrared-visible fiducial makers 122L between the reference image and the field image may be determined based on a mathematical model. FIG. 4 shows an example visualization 400 of a mathematical model of a spatial relationship between the user's eye, the sensor-conspicuous fiducial markers, the glints, and the eye-tracking camera. The visualization 400 represents a spherical cornea of the user's eye defined in terms of a cornea center ($C_i$), a cornea radius ($\rho$), and a pupil depth ($\alpha_i$) where i indicates an image frame corresponding to the field image. Further, the positions of the infrared illuminators 300 are represented in the model by $N_L$ (6 known locations in this example). The sensor-conspicuous fiducial markers 122L are represented in the model by $N_{fi}$ (6 known locations in this example). The eye-tracking camera 108L is defined in terms of $\psi$ that indicates a shift in camera orientation and $\beta$ that indicates a correction factor to a nominal focal length of the eye-tracking camera 108L from the nominal values of these parameters established when the eye-tracking device was in its factory-calibrated state. A change in orientation and/or focal length of the eye-tracking camera 108L may be estimated using a series of log-likelihood functions. A first log-likelihood function is used to estimate geometric error of the eye-tracking camera relative to the glints 300 and the pupil 302:

$$E^2(\theta) = \frac{1}{N_f}\sum_{i=1}^{N_f}\left(\sum_{j=1}^{N_L}\|\pi(G_{i,j}, \psi, \beta) - g_{i,j}\|^2 + \|\pi(P_i, \psi, \beta) - p_i\|^2\right)$$

$G_{i,j}=G_j(C_i,\rho)$ is an intermediate parameter representing the 3D reflection point of the glint j at frame i. $P_i=P(C_i, \alpha_i, \rho)$ is an intermediate parameter representing the 3D pupil center at frame i. Further, in this first log-likelihood function, the optimization parameters for the eye-tracking camera are calculated by the equation:

$$\theta=(\{C_i, \log \alpha_i\}_{i=1}^{N_f}, \log \rho, \psi, \log \beta)$$

A second log-likelihood function is used to estimate the geometric error of the sensor-conspicuous fiducial markers 122L with respect to the eye-tracking camera 108L:

$$E^2_{fiducial}(\theta') = \frac{1}{N_f}\sum_{i=1}^{N_f}\left(\sum_{k=1}^{N_{fi}}\|h(f_k^{cal}, \psi, \beta) - f_{i,k}\|^2\right)$$

In this log-likelihood function, the optimization parameters for the sensor-conspicuous fiducial markers are calculated by the equation:

$$\theta'=(\psi_{fid}, \log \beta_{fid})$$

The computer 116 may be configured to combine the geometric errors calculated from the first and second log-likelihood functions to calculate a final inference of geometric error that accounts for geometric error of the eye-tracking camera 108L and geometric error of the sensor-conspicuous fiducial markers 122L with respect to eye-tracking camera 108L.

This mathematical model is provided as a non-limiting example that may be used to estimate updated extrinsic and intrinsic parameters of the eye-tracking camera 108L based on a change in appearance of the sensor-conspicuous fiducial markers 122L between the reference image and the field image. In particular, this mathematical model estimates an updated orientation and an updated focal length of the eye-tracking camera 108L. In other examples, a different mathematical model may be used to estimate alternative or additional updated extrinsic and intrinsic parameters for field calibration of the eye-tracking camera 108L. The computer 116 may be configured to use any suitable mathematical model to field calibrate the eye-tracking device 100.

Such changes in calibration parameters of the eye-tracking device 100 may be accounted for by the computer 116 in controlling operation of the eye-tracking device 100. In one example, the computer 116 is configured to field calibrate the eye-tracking device 100 at least in part by updating eye-tracking to compensate for a shift in the position from which the eye-tracking camera 108L estimates a position of the pupil (or another feature) of the user's eye based on a change in appearance of the sensor-conspicuous fiducial markers between the reference image and the field image. Returning to the above example, the computer 116 may determine an updated position of the pupil 302 that accounts for a change in orientation and/or focal length of the eye-tracking camera 108L based on field recalibration of the eye-tracking device 100. In another example, the computer 116 may be configured to field calibrate the eye-tracking device 100 at least in part by adjusting a position of content visually presented on the near-eye displays 106L, 106R based on a change in appearance of the one or more sensor-conspicuous fiducial markers between the reference image and the field image. Note that different adjustments may be made for each display, because each of the eye-tracking cameras may be subject to different external effects that cause different changes of extrinsic and/or intrinsic camera parameters.

By integrating the fiducial markers into the eye-tracking device in a manner in which the fiducial markers are observable by the eye-tracking camera, the device can be field calibrated during operation with a greater level of accuracy than other calibration approaches that rely on field measurements of environmental data that does not have an established factory-calibrated spatial relationship, such as features of a real-world physical scene. Such field calibration may allow for the eye-tracking device to maintain operational accuracy and precision even though the eye-tracking device may be subject to external effects that may cause calibration parameters of the eye-tracking camera to vary from a factory-calibrated state. Moreover, such field calibration can be performed to achieve these benefits even when the intermediate hinge/joint between the eye-tracking camera and the set of fiducial markers has moved the relative positions of the camera/fiducial markers.

In the illustrated example, the eye-tracking device 100 is field calibrated based on images acquired by the eye-tracking cameras 108L, 108R. In some implementations, field calibration of the eye-tracking device 100 may be performed based on measurements and information from other sensors. For example, sensor-conspicuous fiducial markers may be integrated into the display frame 102 in areas that are observable by the outward-facing cameras 112, 114. In such implementations, field calibration may be performed based on reference images and field images acquired by the outward-facing cameras 112, 114 alternatively or in addition to the reference images and field images acquired by the eye-tracking cameras 108L, 108R. In some implementations, still other sensor information may be used for field calibration of the eye-tracking device 100. For example, IMU data, audio data acquired by a microphone (not shown), and/or other sensor data of the eye-tracking device 100 may be used for field calibration.

In some implementations, where the fiducial markers are attached to a relevant subsystem of the eye-tracking device, the field calibration process may change the relevant subsystem parameters instead of or in addition to the camera. For example, the fiducial markers may be attached to a display of the eye-tracking device such that they are observable by the eye-tracking camera. If the orientation of the display changes in relation to the eye-tracking camera, the field-calibration process may report that change via the observed change in appearance of the fiducial markers. Further, such a change may then be accounted for by the display subsystem or other subsystems of the eye-tracking device.

Figure 5:
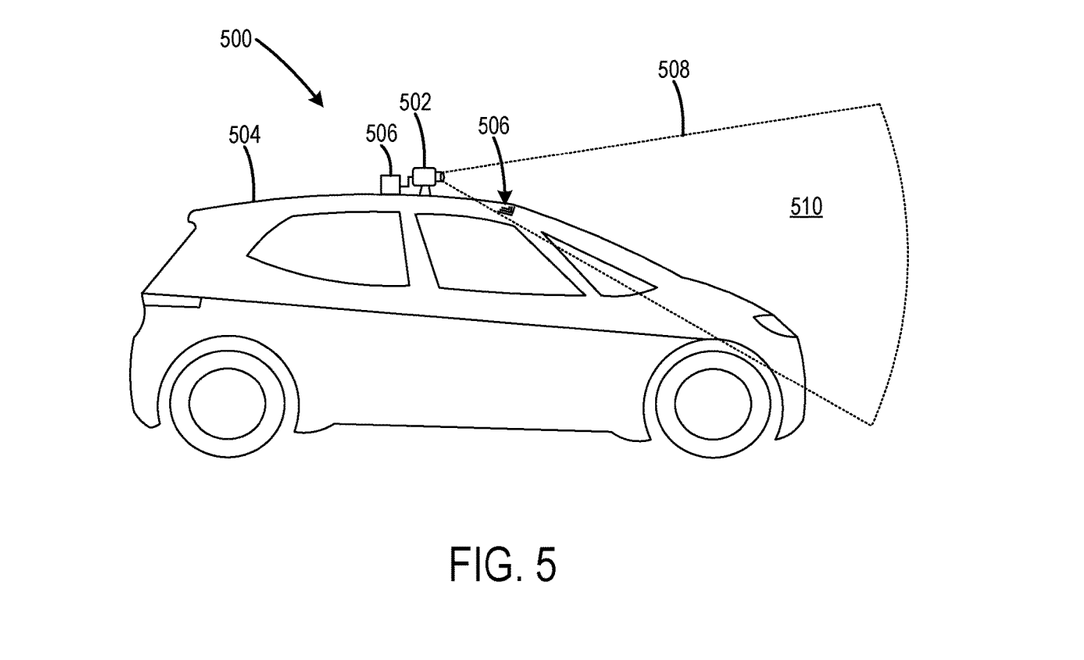
FIGS. 5-6 show an example autonomous vehicle including sensor-conspicuous fiducial markers for field calibration of the autonomous vehicle.
Figure 6:
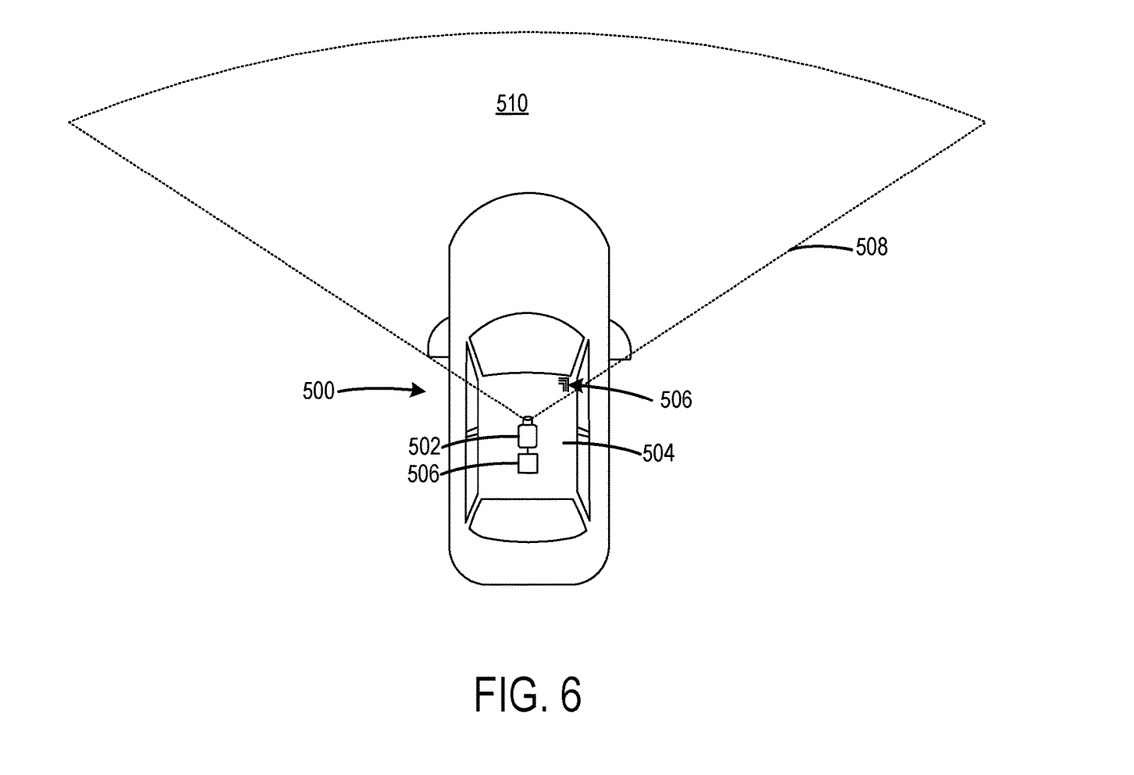

The foregoing drawings and description identify one example device that uses integrated sensor-conspicuous fiducial markers to field calibrate the device. Other, different, devices also lie within the spirit and scope of this disclosure. FIGS. 5-6 show another device in the form of an autonomous vehicle 500 that includes integral sensor-conspicuous fiducial markers that are used to field calibrate the autonomous vehicle 500. The autonomous vehicle 500 includes a forward-facing camera 502 that is disposed on a roof frame 504 of the autonomous vehicle 500. The forward-facing camera 502 is operatively coupled to a computer 506. The forward-facing camera 502 is configured to acquire images of a field of view 508 of a real-world physical scene 510 in front of the autonomous vehicle 500. The forward-facing camera 502 may include any suitable type of camera including, but not limited to, a color/monochrome camera, an infrared camera, a depth camera, or another type of camera. The forward-facing camera 502 is configured to send acquired images to the computer 506 to use as input to control operation of the autonomous vehicle 500. Moreover, the camera may be positioned at any suitable location on the frame of the autonomous vehicle 500.

The autonomous vehicle 500 includes sensor-conspicuous fiducial markers 512 disposed on the roof frame 504. The sensor-conspicuous fiducial markers 512 have a factory-calibrated spatial relationship relative to the forward-facing camera 502 while the autonomous vehicle 500 is in a factory-calibrated state. In particular, the sensor-conspicuous fiducial markers 512 are positioned on the roof frame 504 such that the sensor-conspicuous fiducial markers 512 are observable in the field of view 508 of the forward-facing camera 502. In another example implementation, the forward-facing camera may be disposed on a dashboard frame or behind a rearview mirror of the autonomous vehicle such that the field of view of the forward-facing camera is directed through a front windshield of the autonomous vehicle (i.e., a "dash cam" arrangement). Further, the sensor-conspicuous fiducial markers may be positioned on a hood of the autonomous vehicle such that the sensor-conspicuous fiducial markers are observable in the field of view of the forward-facing camera. In such an arrangement, a hood hinge that enables the hood to be pivoted between an open position and a closed position may be intermediate the forward-facing camera and the set of sensor-conspicuous fiducial markers. In another example, fiducial markers may be disposed on an area of a door frame where the fiducial markers are observable by the forward-facing camera. A door hinge/joint may be intermediate the forward-facing camera and the fiducial markers. Any suitable hinge or joint may be intermediate the forward-facing camera and the sensor-conspicuous fiducial markers.

Figure 7:
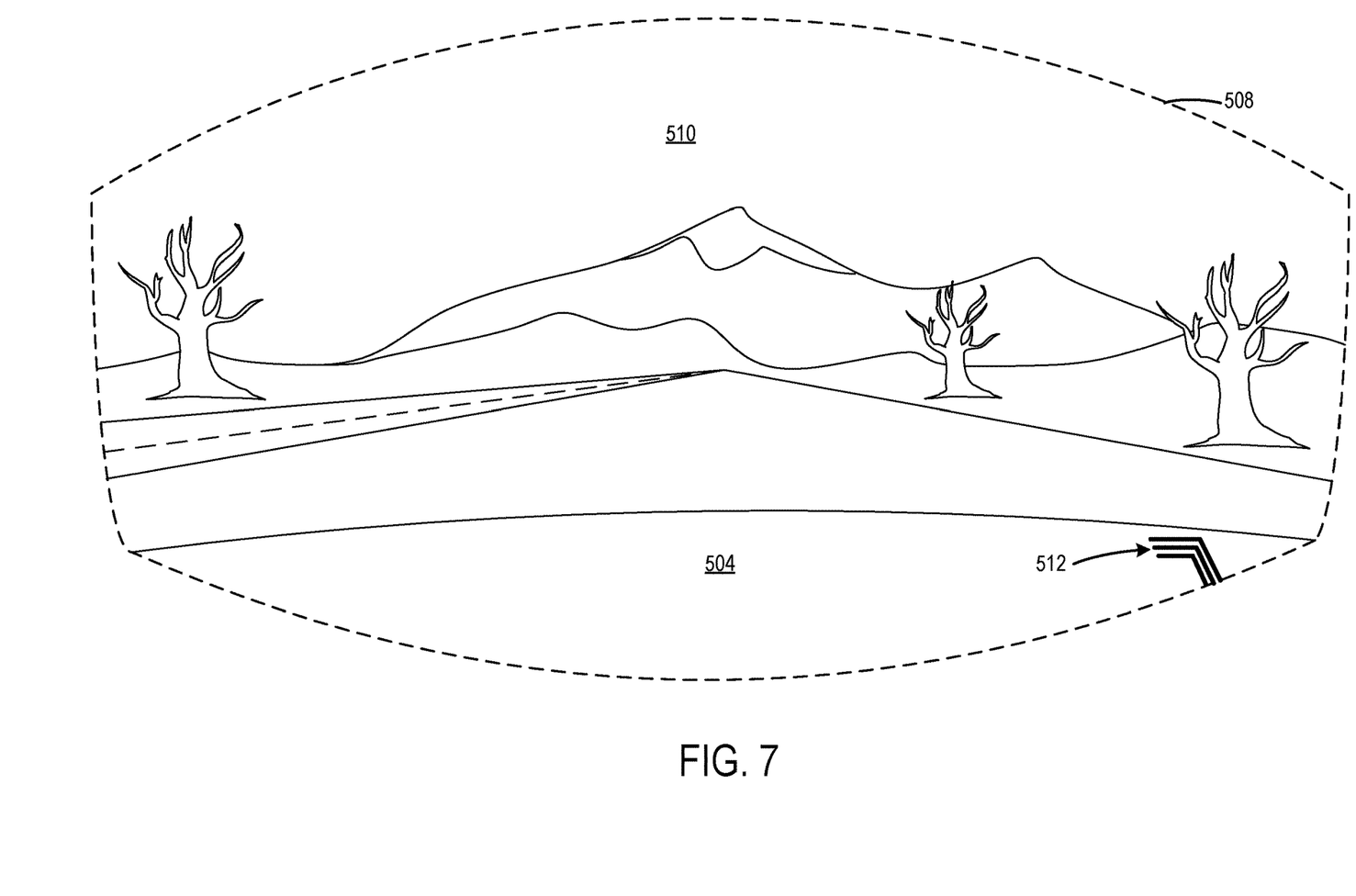
FIG. 7 shows a view from a camera of the autonomous vehicle shown in FIGS. 5-6.

FIG. 7 shows an example view from a perspective of the forward-facing camera 502. In the illustrated example, the autonomous vehicle 500 is traveling on a road in the real-world physical scene 510 where the autonomous vehicle 500 may be subject to external effects that may cause calibration parameters of the forward-facing camera 502 to vary from a factory-calibrated state. As shown in the field of view 508, a portion of the roof frame 504 including the sensor-conspicuous fiducial markers 512 is observable by the forward-facing camera 502. Such an arrangement allows for the forward-facing camera 502 to acquire images of the sensor-conspicuous fiducial markers 512 for field calibration of the autonomous vehicle 500. In the illustrated example, the sensor-conspicuous fiducial markers 512 include a plurality of right-angled shapes that form a pattern that is conspicuous to the forward-facing camera 502. Alternatively, knowledge of the shape of the vehicle frame itself in the area observed by the forward-facing camera may serve the purpose of a fiducial marker. In other implementations, the fiducial markers may be disposed at another location on the frame of the autonomous vehicle that is observable by the forward-facing camera (or another sensor) for field calibration purposes.

The sensor-conspicuous fiducial markers 512 may take any suitable form that allows the forward-facing camera 502 to acquire images in which the fiducial markers are easily distinguishable from the surrounding structure of the autonomous vehicle 500. In some examples, the sensor-conspicuous fiducial markers 512 may be painted on the roof frame 504. In examples where the forward-facing camera 502 is an infrared camera, the sensor-conspicuous fiducial markers 512 may be infrared reflective markers. In still other examples, the sensor-conspicuous fiducial markers 512 may be active illuminators (e.g., infrared LEDs or visible light LEDs). In some examples, the sensor-conspicuous fiducial markers 512 may be etched on the roof frame 504. In some examples, the sensor-conspicuous fiducial markers 512 may be attached to the roof frame 504, such as via adhesive (e.g., stickers).

The computer 506 is configured to acquire, via the forward-facing camera 502, a reference image while the autonomous vehicle 500 is in the factory-calibrated state. The reference image measures the factory-calibrated spatial relationship of the sensor-conspicuous fiducial markers 512 relative to the forward-facing camera 502 while the autonomous vehicle 500 is in the factory-calibrated state. The computer 506 may be configured to use the reference image to determine extrinsic and intrinsic parameters of the forward-facing camera 502 while the autonomous vehicle 500 is in the factory-calibrated state.

Further, should the camera calibration parameters change from a nominal position assumed by design or established during manufacturing or assembly, the corresponding change in the appearance of the fiducial maker may be used to estimate or compute how the parameters have changed, and this change may be then considered or compensated for in controlling operation of the autonomous vehicle 500. In particular, the computer 506 is configured to acquire, via the forward-facing camera 502, a field image measuring an updated spatial relationship of the sensor-conspicuous fiducial markers 512 relative to the forward-facing camera 502. The computer 506 is configured to field calibrate the autonomous vehicle 500 based on the reference image and the field image. For example, the computer 506 may be configured to estimate updated extrinsic and intrinsic parameters of the forward-facing camera 502 based on a change in appearance of the fiducial markers 512 between the reference image and the field image. In one example, an updated orientation of the forward-facing camera 502 and/or an updated focal length of the forward-facing camera 502 may be determined using a mathematical model.

Such changes in calibration parameters of the autonomous vehicle 500 may be accounted for by the computer 506 in controlling operation of the autonomous vehicle 500. In one example, the computer 506 may be configured to field calibrate the autonomous vehicle 500 by vehicle position tracking to compensate for a shift in an estimated position of the sensor-conspicuous fiducial markers between the reference image and the field image. The computer 506 may adjust any sort of control of the autonomous vehicle 500 based on such field calibration.

By integrating the fiducial markers into the frame of the autonomous vehicle in a manner in which the fiducial markers are observable by the forward-facing camera, the autonomous vehicle can be field calibrated during operation with a greater level of accuracy than other calibration approaches that rely on field measurements of environmental data that does not have an established factory-calibrated spatial relationship, such as features of a real-world physical scene. Such field calibration may allow for the autonomous vehicle to maintain operational accuracy and precision even though the autonomous vehicle may be subject to external effects that may cause calibration parameters of the forward-facing camera to vary from a factory-calibrated state. Moreover, such field calibration can be performed to achieve these benefits even when an intermediate hinge/joint (e.g., on the hood or a door) between the forward-facing camera and the set of fiducial markers has moved the relative positions of the camera/fiducial markers.

In some implementations, the computer 506 may be configured to field calibrate other subsystems of the autonomous vehicle based on fiducial markers observed by the forward-facing camera. For example, the forward-facing camera may have a line of sight to fiducial markers disposed on a LIDAR subsystem that is fixed to a frame of the autonomous vehicle. In this example, changes in the orientation or position of the LIDAR subsystem are conspicuous to the forward-facing camera via a change in appearance of the fiducial markers between a reference image and a field image, allowing for the computer to field calibrate the LIDAR subsystem in the manner discussed herein.

The field calibration concepts described herein are broadly applicable to any suitable type of device that includes sensor-conspicuous fiducial markers that are integral to the device at a location that is observable by a sensor of the device.

Figure 8:
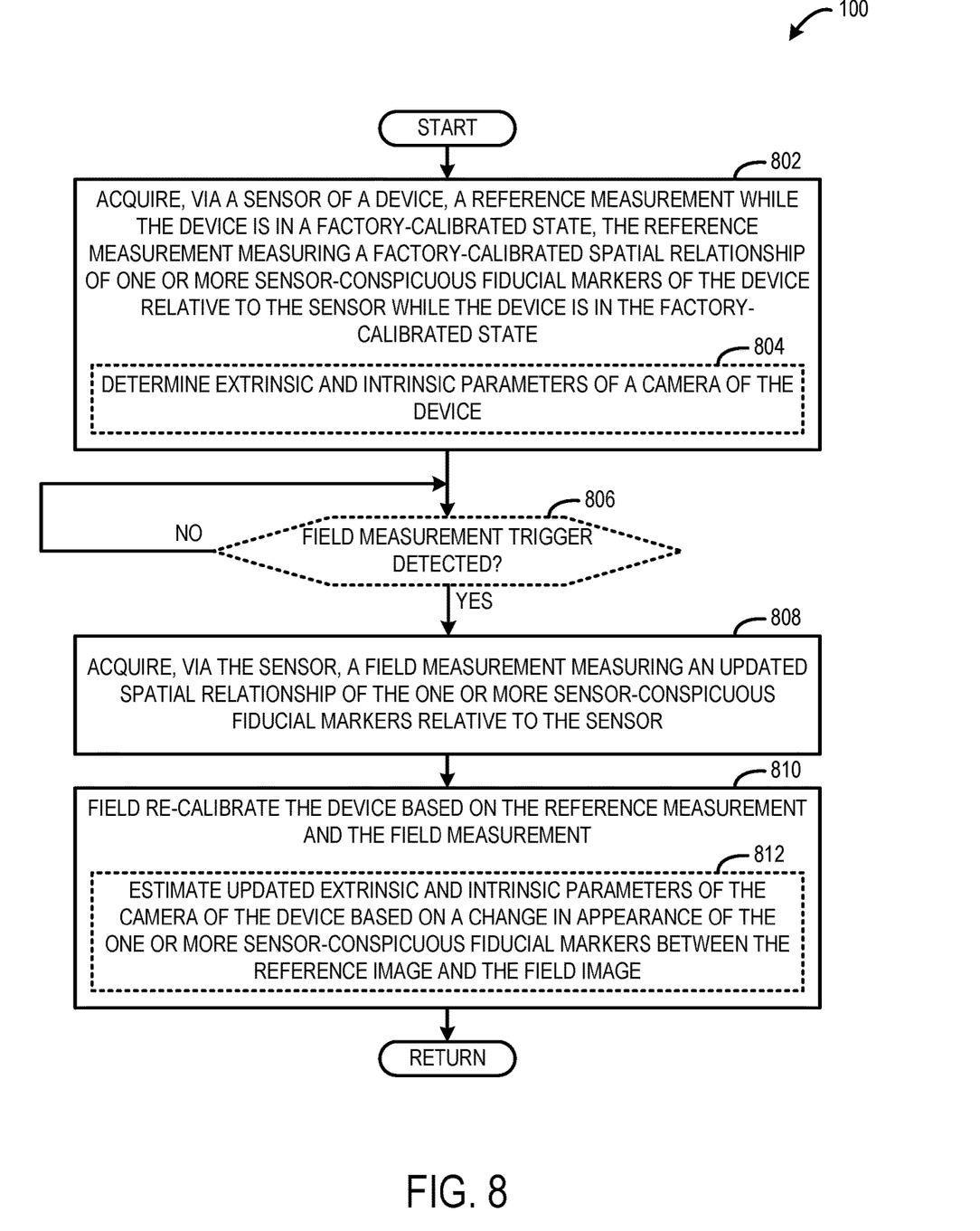
FIG. 8 is a flowchart of an example computer-implemented method of field calibrating a device using sensor-conspicuous fiducial markers integral to the device.

FIG. 8 shows an example computer-implemented method 800 of field calibrating a device using sensor-conspicuous fiducial markers that are integral to the device. For example, the method 800 may be performed by the eye-tracking device 100 shown in FIGS. 1-2, the autonomous vehicle 500 shown in FIGS. 5-6, or more generally any type of device that includes one or more sensor-observable fiducial markers integrated into the device in a manner that is observable by a sensor of the device.

At 802, the method 800 includes acquiring, via a sensor of a device, a reference measurement while the device is in a factory-calibrated state. The reference measurement measures a factory-calibrated spatial relationship of one or more sensor-conspicuous fiducial markers of the device relative to the sensor while the device is in the factory-calibrated state. In some implementations where the sensor is a camera, the reference measurement is useable to determine extrinsic and intrinsic properties of the camera.

For the example eye-tracking device 100 shown in FIGS. 1-2, the infrared eye-tracking cameras 108L, 108R acquire reference images of the respective sets of infrared visible fiducial markers 122L, 122R to establish the factory-calibrated spatial relationships of the infrared-visible fiducial markers relative to the infrared eye-tracking cameras while the eye-tracking device is in the factory-calibrated state. For the autonomous vehicle 500 shown in FIGS. 5-6, the forward-facing camera 502 acquires a reference image of the fiducial markers 512 while the autonomous vehicle is in a factory-calibrated state.

In some implementations, at 806, the method 800 optionally may include determining that a field measurement trigger is detected. In some implementations, calibration parameters of the device may be monitored throughout operation of the device. In the example of the sensor including a camera, extrinsic and intrinsic parameters of the camera may be monitored. A deviation of a calibration parameter greater than a deviation threshold may serve as a field measurement trigger. In another example a field measurement trigger may be detected based on a designated sampling frequency (e.g., every hour, day, month, year of operation of the eye-tracking device). If the field measurement trigger is detected, then the method 800 moves to 808. Otherwise, the method 800 returns to 806 and continues to monitor for a field measurement trigger.

At 808, the method 800 includes acquiring, via the sensor, a field measurement measuring an updated spatial relationship of the one or more sensor-conspicuous fiducial markers relative to the sensor.

For the example eye-tracking device 100 shown in FIGS. 1-2, the infrared eye-tracking cameras 108L, 108R acquire field images of the respective sets of infrared-visible fiducial markers 122L, 122R. For the autonomous vehicle 500 shown in FIGS. 5-6, the forward-facing camera 502 acquires a field image of the fiducial markers 512.

At 810, the method 800 includes field calibrating the device based on the reference measurement and the field measurement. In some implementations where the sensor includes a camera, at 812, the method 800 optionally may include estimating updated extrinsic and intrinsic parameters of the camera based on a change in appearance of the one or more fiducial markers between the reference image and the field image. The device may be field calibrated in any suitable manner based on the change in appearance of the fiducial markers between the reference image and the field image. Once the device is field calibrated, the method 800 returns to other operations.

For the example eye-tracking device 100 shown in FIGS. 1-2, in some examples, field calibrating the eye-tracking device may include updating eye-tracking to compensate for a shift in the position from which the eye-tracking camera estimates a position of a pupil of a user's eye based on a change in appearance of the one or more sensor-conspicuous fiducial markers between the reference image and the field image. In another example, field calibrating the device may include adjusting a position of content visually presented on the near-eye displays 106R, 106L based on a change in appearance of the one or more sensor-conspicuous fiducial markers between the reference image and the field image.

For the example autonomous vehicle 500 shown in FIGS. 5-6, in some examples field calibrating the autonomous vehicle may include adjusting vehicle position tracking to compensate for a shift in an estimated position of the sensor-conspicuous fiducial markers between the reference image and the field image.

By performing the method of field calibration using fiducial markers that are integral to the device, the device can be calibrated during operation with a degree of accuracy that is greater than other calibration approaches. For example, the fiducial marker-based field calibration method may be more accurate that other calibration methods that rely on field measurements of environmental data that does not have any established factory-calibrated spatial relationship.

In some implementations, the methods and processes described herein may be tied to a computing system including one or more computing devices. In particular, such methods and processes may be implemented as a computer-application program or service, an application-programming interface (API), a library, and/or other computer-program product.

Figure 9:
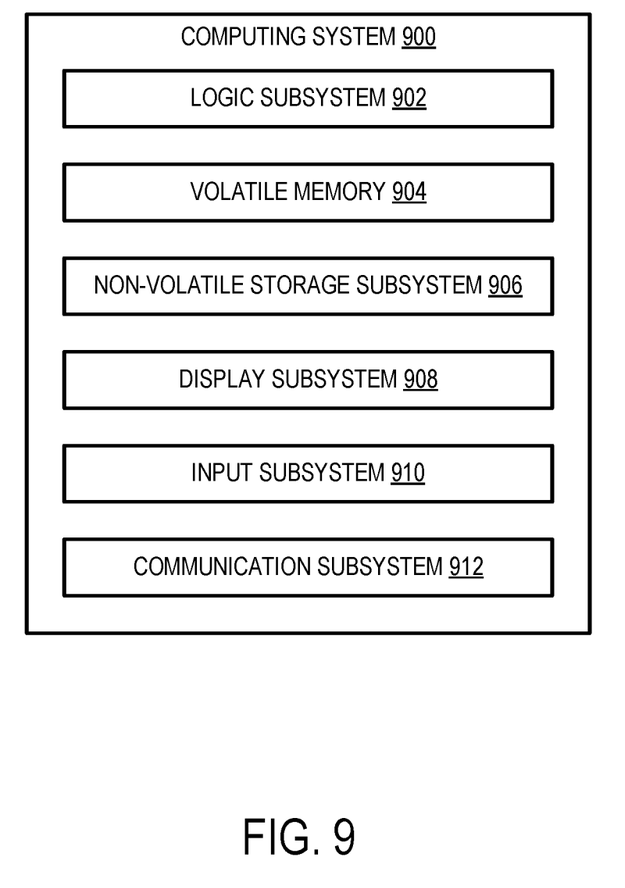
FIG. 9 shows an example computing system.

FIG. 9 schematically shows a non-limiting implementation of a computing system 900 that can enact one or more of the methods and processes described above. Computing system 900 is shown in simplified form. For example, the computing system 900 may embody any of computer 116 of the eye-tracking device 100 shown in FIGS. 1-2, computer 506 of the autonomous vehicle 500 shown in FIG. 5-6, or more generally any computing system that is configured to perform the field calibration methods described herein. Computing system 900 may take the form of one or more device control computers, personal computers, server computers, tablet computers, home-entertainment computers, network computing devices, gaming devices, mobile computing devices, mobile communication devices (e.g., smart phone), integrated microcontrollers, wearable computing devices such as smart wristwatches and head mounted augmented reality devices, and/or other computing devices.

Computing system 900 includes a logic subsystem 902 volatile memory 904, and a non-volatile storage subsystem 906. Computing system 900 may optionally include a display subsystem 908, input subsystem 910, communication subsystem 912, and/or other components not shown in FIG. 9.

Logic subsystem 902 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 902 may include one or more physical processors (hardware) configured to execute software instructions. Additionally or alternatively, the logic subsystem 902 may include one or more hardware logic circuits or firmware devices configured to execute hardware-implemented logic or firmware instructions. Processors of the logic subsystem 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic subsystem 902 may be virtualized and executed by remotely accessible, networked computing devices configured in a cloud-computing configuration. In such a case, these virtualized aspects are run on different physical logic processors of various different machines, it will be understood.

Volatile memory 904 may include physical devices that include random access memory. Volatile memory 904 is typically utilized by logic subsystem 902 to temporarily store information during processing of software instructions. It will be appreciated that volatile memory 904 typically does not continue to store instructions when power is cut to the volatile memory 904.

Non-volatile storage subsystem 906 includes one or more physical devices configured to hold instructions executable by the logic subsystem to implement the methods and processes described herein. When such methods and processes are implemented, the state of non-volatile storage subsystem 906 may be transformed—e.g., to hold different data.

Non-volatile storage subsystem 906 may include physical devices that are removable and/or built in. Non-volatile storage subsystem 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage subsystem 906 may include nonvolatile, dynamic, static, read/write, read-only, sequential-access, location-addressable, file-addressable, and/or content-addressable devices. It will be appreciated that non-volatile storage subsystem 906 is configured to hold instructions even when power is cut to the non-volatile storage subsystem 906.

Aspects of logic subsystem 902, volatile memory 904, and non-volatile storage subsystem 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 908 may be used to present a visual representation of data held by non-volatile storage subsystem 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic subsystem 902, volatile memory 904, and/or non-volatile storage subsystem 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

In an example, an eye-tracking device comprises a display frame, a temple extension coupled to the display frame, an infrared eye-tracking camera disposed on the display frame, a plurality of infrared-visible fiducial markers disposed on the temple extension, the plurality of infrared-visible fiducial markers having a factory-calibrated spatial relationship relative to each other and to the infrared eye-tracking camera while the eye-tracking device is in a factory-calibrated state, one or more infrared illuminators disposed on the display frame and configured to illuminate the plurality of infrared-visible fiducial markers, and a computer configured to acquire, via the infrared eye-tracking camera, a reference image while the eye-tracking device is in the factory-calibrated state, the reference image measuring the factory-calibrated spatial relationship of the plurality of infrared-visible fiducial markers relative to each other and relative to the infrared eye-tracking camera while the eye-tracking device is in the factory-calibrated state, acquire, via the eye-tracking camera, a field image measuring an updated spatial relationship of the plurality of infrared-visible fiducial markers relative each other and relative to the infrared eye-tracking camera, and field calibrate the eye-tracking device based on the reference image and the field image. In this example and/or other examples, the infrared-visible fiducial markers may be color-light invisible. In this example and/or other examples, factory calibration of the eye-tracking device may include determining one or more extrinsic parameters of the infrared eye-tracking camera including an orientation of the infrared eye-tracking camera while the infrared eye-tracking camera is in the factory-calibrated state and one or more intrinsic parameters of the infrared eye-tracking camera including a focal length of the infrared eye-tracking camera while the infrared camera is in the factory-calibrated state, and field calibrating the eye-tracking device may include estimating one or more updated extrinsic parameters of the infrared eye-tracking camera including an updated orientation of the infrared eye-tracking camera or one or more updated intrinsic parameters of the infrared eye-tracking camera including an updated focal length of the infrared eye-tracking camera. In this example and/or other examples, the computer may be configured to field calibrate the eye-tracking device at least in part by updating eye-tracking to compensate for a shift in a position from which the infrared eye-tracking camera estimates a position of a pupil of a user's eye based on a change in appearance of the one or more sensor-conspicuous fiducial markers between the reference image and the field image. In this example and/or other examples, the eye-tracking device may further comprise a display, and the computer may be configured to field calibrate the eye-tracking device at least in part by adjusting a position of content visually presented on the display based on a change in appearance of the one or more sensor-conspicuous fiducial markers between the reference image and the field image. In this example and/or other examples, the field image may be acquired responsive to a deviation of a calibration parameter being greater than a deviation threshold.

In another example, a device, comprises a frame, an infrared camera disposed on the frame, one or more infrared-visible, color-light invisible fiducial markers disposed on the frame, the one or more infrared-visible fiducial markers having a factory-calibrated spatial relationship relative to the infrared camera while the device is in a factory-calibrated state, and a computer configured to acquire, via the infrared camera, a reference image while the device is in the factory-calibrated state, the reference image measuring the factory-calibrated spatial relationship of the one or more infrared-visible fiducial markers of the device relative to the infrared camera while the device is in the factory-calibrated state, acquire, via the infrared camera, a field image measuring an updated spatial relationship of the one or more infrared-visible fiducial markers relative to the infrared camera, and field calibrate the device based on the reference image and the field image. In this example and/or other examples, factory calibration of the device may include determining one or more extrinsic parameters of the infrared camera including an orientation of the infrared camera while the infrared camera is in the factory-calibrated state and one or more intrinsic parameters of the infrared camera including a focal length of the infrared camera while the infrared camera is in the factory-calibrated state, and the computer may be configured to field calibrate the device at least in part by estimating one or more updated extrinsic parameters of the infrared camera including an updated orientation of the infrared camera or one or more updated intrinsic parameters of the infrared camera including an updated focal length of the infrared camera. In this example and/or other examples, the infrared camera may be an infrared eye-tracking camera disposed on a display frame of the device, the one or more infrared-visible, color-light invisible fiducial markers may include a plurality of infrared-reflective markers disposed on a temple extension of the device that is visible in a field of view of the infrared eye-tracking camera, and the device may further comprise one or more infrared illuminators disposed on the display frame and configured to illuminate the plurality of infrared-reflective markers. In this example and/or other examples, the computer may be configured to field calibrate the device at least in part by updating eye-tracking to compensate for a shift in a position from which the infrared eye-tracking camera estimates a position of a pupil of a user's eye based on a change in appearance of the one or more sensor-conspicuous fiducial markers between the reference image and the field image. In this example and/or other examples, the device may further comprise a display, the computer may be configured to field calibrate the device at least in part by adjusting a position of content visually presented on the display based on a change in appearance of the one or more infrared-visible, color-light invisible fiducial markers between the reference image and the field image. In this example and/or other examples, the device may be a vehicle, the infrared camera may be disposed on a frame of the vehicle, and the one or more infrared-visible, color-light invisible fiducial markers may be positioned on an area of the frame of the vehicle that is in a field of view of the infrared camera.

In yet another example, a computer-implemented method of field calibrating an eye-tracking device comprises acquiring, via an infrared eye-tracking camera of the eye-tracking device, a reference image while the eye-tracking device is in a factory-calibrated state, the reference image measuring a factory-calibrated spatial relationship of the one or more infrared-visible fiducial markers of the eye-tracking device relative to the infrared eye-tracking camera while the device is in the factory-calibrated state, acquiring, via the infrared eye-tracking camera, a field image measuring an updated spatial relationship of the one or more infrared-visible fiducial markers relative to the infrared eye-tracking camera, the infrared eye-tracking camera being disposed on the eye-tracking device such that a user's eye and one or more infrared-visible fiducial markers are visible in a field of view of the eye-tracking camera when the eye-tracking device is worn by the user, and field calibrating the eye-tracking device based on the reference image and the field image. In this example and/or other examples, factory calibration of the eye-tracking device may include determining one or more extrinsic parameters of the infrared eye-tracking camera including an orientation of the infrared eye-tracking camera while the infrared eye-tracking camera is in the factory-calibrated state and one or more intrinsic parameters of the infrared eye-tracking camera including a focal length of the infrared eye-tracking camera while the infrared camera is in the factory-calibrated state, and field calibrating the eye-tracking device may include estimating one or more updated extrinsic parameters of the infrared eye-tracking camera including an updated orientation of the infrared eye-tracking camera or one or more updated intrinsic parameters of the infrared eye-tracking camera including an updated focal length of the infrared eye-tracking camera. In this example and/or other examples, the updated orientation of the infrared eye-tracking camera or the updated focal length of the infrared eye-tracking camera may be estimated based on a change in appearance of the one or more infrared-visible fiducial markers between the reference image and the field image. In this example and/or other examples, the infrared eye-tracking camera may be disposed on a display frame of the eye-tracking device, the one or more infrared-visible fiducial markers may include a plurality of infrared-reflective markers disposed on a temple extension of the eye-tracking device, and the eye-tracking device may further comprise one or more infrared illuminators disposed on the display frame and configured to illuminate the plurality of infrared-reflective markers. In this example and/or other examples, field calibrating the eye-tracking device may include updating eye-tracking to compensate for a shift in a position from which the infrared eye-tracking camera estimates a position of a pupil of a user's eye based on a change in appearance of the one or more infrared-visible fiducial markers between the reference image and the field image. In this example and/or other examples, the eye-tracking device may include a display, and field calibrating the eye-tracking device may include adjusting a position of content visually presented on the display based on a change in appearance of the one or more infrared-visible fiducial markers between the reference image and the field image. In this example and/or other examples, the field image may be acquired responsive to a deviation of a calibration parameter being greater than a deviation threshold. In this example and/or other examples, the field image may be acquired according to a designated sampling frequency.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An eye-tracking device, comprising:
a display frame;
a temple extension coupled to the display frame;
an infrared eye-tracking camera disposed on the display frame;
a plurality of infrared-visible fiducial markers disposed on the temple extension and visible in a field of view of the eye-tracking camera when the eye-tracking device is worn by a user, the plurality of infrared-visible fiducial markers having a factory-calibrated spatial relationship relative to each other and to the infrared eye-tracking camera while the eye-tracking device is in a factory-calibrated state;
one or more infrared illuminators disposed on the display frame and configured to illuminate the plurality of infrared-visible fiducial markers; and
a computer configured to:
acquire, via the infrared eye-tracking camera, a reference image while the eye-tracking device is in the factory-calibrated state, the reference image measuring the factory-calibrated spatial relationship of the plurality of infrared-visible fiducial markers relative to each other and relative to the infrared eye-tracking camera while the eye-tracking device is in the factory-calibrated state;
acquire, via the eye-tracking camera, a field image measuring an updated spatial relationship of the plurality of infrared-visible fiducial markers relative each other and relative to the infrared eye-tracking camera; and
field calibrate the eye-tracking device based on the reference image and the field image.

2. The eye-tracking device of claim 1, wherein the infrared-visible fiducial markers are color-light invisible.

3. The eye-tracking device of claim 1, wherein factory calibration of the eye-tracking device includes determining one or more extrinsic parameters of the infrared eye-tracking camera including an orientation of the infrared eye-tracking camera while the infrared eye-tracking camera is in the factory-calibrated state and one or more intrinsic parameters of the infrared eye-tracking camera including a focal length of the infrared eye-tracking camera while the infrared camera is in the factory-calibrated state, and wherein field calibrating the eye-tracking device includes estimating one or more updated extrinsic parameters of the infrared eye-tracking camera including an updated orientation of the infrared eye-tracking camera or one or more updated intrinsic parameters of the infrared eye-tracking camera including an updated focal length of the infrared eye-tracking camera.

4. The eye-tracking device of claim 1, wherein the computer is configured to field calibrate the eye-tracking device at least in part by updating eye-tracking to compensate for a shift in a position from which the infrared eye-tracking camera estimates a position of a pupil of the user's eye based on a change in appearance of the one or more sensor-conspicuous fiducial markers between the reference image and the field image.

5. The eye-tracking device of claim 1, further comprising a display, and wherein the computer is configured to field calibrate the eye-tracking device at least in part by adjusting a position of content visually presented on the display based on a change in appearance of the one or more sensor-conspicuous fiducial markers between the reference image and the field image.

6. The eye-tracking device of claim 1, wherein the field image is acquired responsive to a deviation of a calibration parameter being greater than a deviation.

7. A device, comprising:
a frame;
an infrared camera disposed on the frame;
one or more infrared-visible, color-light invisible fiducial markers disposed on the frame such that the one or more infrared-visible, color-light invisible fiducial markers are visible in a field of view of the infrared camera during field operation of the device, the one or more infrared-visible fiducial markers having a factory-calibrated spatial relationship relative to the infrared camera while the device is in a factory-calibrated state; and
a computer configured to:
acquire, via the infrared camera, a reference image while the device is in the factory-calibrated state, the reference image measuring the factory-calibrated spatial relationship of the one or more infrared-visible fiducial markers of the device relative to the infrared camera while the device is in the factory-calibrated state;
acquire, via the infrared camera, a field image measuring an updated spatial relationship of the one or more infrared-visible fiducial markers relative to the infrared camera; and
field calibrate the device based on the reference image and the field image.

8. The device of claim 7, wherein factory calibration of the device includes determining one or more extrinsic parameters of the infrared camera including an orientation of the infrared camera while the infrared camera is in the factory-calibrated state and one or more intrinsic parameters of the infrared camera including a focal length of the infrared camera while the infrared camera is in the factory-calibrated state, and wherein the computer is configured to field calibrate the device at least in part by estimating one or more updated extrinsic parameters of the infrared camera including an updated orientation of the infrared camera or one or more updated intrinsic parameters of the infrared camera including an updated focal length of the infrared camera.

9. The device of claim 7, wherein the infrared camera is an infrared eye-tracking camera disposed on a display frame of the device, wherein the one or more infrared-visible, color-light invisible fiducial markers include a plurality of infrared-reflective markers disposed on a temple extension of the device that is visible in the field of view of the infrared eye-tracking camera when the device is worn by a user, and wherein the device further comprises one or more infrared illuminators disposed on the display frame and configured to illuminate the plurality of infrared-reflective markers.

10. The device of claim 9, wherein the computer is configured to field calibrate the device at least in part by updating eye-tracking to compensate for a shift in a position from which the infrared eye-tracking camera estimates a position of a pupil of the user's eye based on a change in appearance of the one or more sensor-conspicuous fiducial markers between the reference image and the field image.

11. The device of claim 7, further comprising a display, wherein the computer is configured to field calibrate the device at least in part by adjusting a position of content visually presented on the display based on a change in appearance of the one or more infrared-visible, color-light invisible fiducial markers between the reference image and the field image.

12. The device of claim 7, wherein the device is a vehicle, wherein the infrared camera is disposed on a frame of the vehicle, and wherein the one or more infrared-visible, color-light invisible fiducial markers are positioned on an area of the frame of the vehicle that is in a field of view of the infrared camera.

13. A computer-implemented method of field calibrating an eye-tracking device, the computer-implemented method comprising:
acquiring, via an infrared eye-tracking camera of the eye-tracking device, a reference image while the eye-tracking device is in a factory-calibrated state, the reference image measuring a factory-calibrated spatial relationship of one or more infrared-visible fiducial markers of the eye-tracking device relative to the infrared eye-tracking camera while the device is in the factory-calibrated state;
acquiring, via the infrared eye-tracking camera, a field image measuring an updated spatial relationship of the one or more infrared-visible fiducial markers relative to the infrared eye-tracking camera, the infrared eye-tracking camera being disposed on the eye-tracking device such that a user's eye and the one or more infrared-visible fiducial markers are visible in a field of view of the eye-tracking camera when the eye-tracking device is worn by the user; and
field calibrating the eye-tracking device based on the reference image and the field image.

14. The computer-implemented method of claim 13, wherein factory calibration of the eye-tracking device includes determining one or more extrinsic parameters of the infrared eye-tracking camera including an orientation of the infrared eye-tracking camera while the infrared eye-tracking camera is in the factory-calibrated state and one or more intrinsic parameters of the infrared eye-tracking camera including a focal length of the infrared eye-tracking camera while the infrared camera is in the factory-calibrated state, and wherein field calibrating the eye-tracking device includes estimating one or more updated extrinsic parameters of the infrared eye-tracking camera including an updated orientation of the infrared eye-tracking camera or one or more updated intrinsic parameters of the infrared eye-tracking camera including an updated focal length of the infrared eye-tracking camera.

15. The computer-implemented method of claim 14, wherein the updated orientation of the infrared eye-tracking camera or the updated focal length of the infrared eye-tracking camera is estimated based on a change in appearance of the one or more infrared-visible fiducial markers between the reference image and the field image.

16. The computer-implemented method of claim 13, wherein the infrared eye-tracking camera is disposed on a display frame of the eye-tracking device, wherein the one or more infrared-visible fiducial markers includes a plurality of infrared-reflective markers disposed on a temple extension of the eye-tracking device, and wherein the eye-tracking device further comprises one or more infrared illuminators disposed on the display frame and configured to illuminate the plurality of infrared-reflective markers.

17. The computer-implemented method of claim 16, wherein field calibrating the eye-tracking device includes updating eye-tracking to compensate for a shift in a position from which the infrared eye-tracking camera estimates a position of a pupil of the user's eye based on a change in appearance of the one or more infrared-visible fiducial markers between the reference image and the field image.

18. The computer-implemented method of claim 16, wherein the eye-tracking device includes a display, and wherein field calibrating the eye-tracking device includes adjusting a position of content visually presented on the display based on a change in appearance of the one or more infrared-visible fiducial markers between the reference image and the field image.

19. The computer-implemented method of claim 13, wherein the field image is acquired responsive to a deviation of a calibration parameter being greater than a deviation threshold.

20. The computer-implemented method of claim 13, wherein the field image is acquired according to a designated sampling frequency.

* * * * *